United States Patent

[11] 3,599,192

[72] Inventor Jan W. Rabek
Los Angeles, Calif.
[21] Appl No. 782,926
[22] Filed Dec. 11, 1968
[45] Patented Aug. 10, 1971
[73] Assignee RCA Corporation

[54] TRANSDUCER SUPPORTING ARRANGEMENT FOR DISK MEMORY
5 Claims, 11 Drawing Figs.

[52] U.S. Cl. 340/174.1B
[51] Int. Cl. G11b 5/48, G11b 21/04
[50] Field of Search 179/100.2 CA, 100.2 C, 100.2 T; 346/74 MC, 137; 340/174.1 B, 174.1 F, 174.1 C

[56] References Cited

UNITED STATES PATENTS

| | | | |
|---|---|---|---|
| 3,105,880 | 10/1963 | Moriya | 179/100.2 T |
| 3,402,403 | 8/1968 | Lichowsky | 179/100.2 T |
| 3,170,148 | 2/1965 | Steele | 340/174.1 |
| 3,191,164 | 6/1965 | Lekas | 340/174.1 |
| 3,324,281 | 6/1967 | Morse | 340/174.1 |
| 3,484,760 | 12/1969 | Perkins | 340/174.1 |
| 3,503,060 | 3/1970 | Goddard et al. | 340/174.1 |
| 2,922,106 | 1/1960 | Oates et al. | 340/174.1 |
| 3,153,241 | 10/1964 | Ramreth et al. | 340/174.1 |

*Primary Examiner*—Bernard Konick
*Assistant Examiner*—Vincent P. Canney
*Attorney*—H. Christoffersen

ABSTRACT: A disk storage system in which the spacing between a pair of heads employed to respectively write on and read from the disk is a function of the spacing of the heads from the center of the disk. The heads are moved along radial lines relative to the center of the disk while maintaining them substantially equidistant from the center of the disk to maintain constant the number of bits recorded in the length of track between the heads.

INVENTOR
JAN W. RABEK
BY Samuel Cohen
ATTORNEY

INVENTOR
JAN W. RABEK
BY Samuel Cohen
ATTORNEY

INVENTOR
JAN W. RABEK

BY [signature]
ATTORNEY

INVENTOR
JAN W. RABEK
BY [signature]
ATTORNEY

INVENTOR
JAN W. RABEK
BY Samuel Cohen
ATTORNEY

TRANSDUCER SUPPORTING ARRANGEMENT FOR DISK MEMORY

BACKGROUND OF THE INVENTION

The problem dealt with in the present application is the design of a disk storage system, such as one of the magnetic-type, in which it is desired to write after read or vice versa. In a system of this type, whether employing spiral or circular scan, if, as is usual practice, the disk speed is constant and the recording frequency is constant, as the head moves radially the bit-packing density changes. At the outer end of the radius, the track moves beneath the recording head relatively rapidly so that the linear bit-packing density is relatively low. On the other hand, as the head moves towards the disk center, the track moves beneath the head relatively slowly so that the bit-packing density becomes relatively high.

In a system of the type discussed above, if two heads are employed and if the read head is fixed to the write head, as is usual practice, for example, in magnetic disk systems, as the radial distance between the heads and the disk center changes, the number of bits recorded in the space between the read and write heads also changes. This, of course, is highly undesirable as it introduces read errors.

The object of the present invention is to provide a disk memory system employing two heads in which the number of bits recorded on the length of track between the heads remains constant, regardless of the radial distance of the heads from the center of the disk.

SUMMARY OF THE INVENTION

Two heads are mounted to follow the same track on the disk as the disk rotates and means are provided for changing the spacing between the heads as a function of their distance from the disk center.

DETAILED DESCRIPTION

Figures 1, 2:
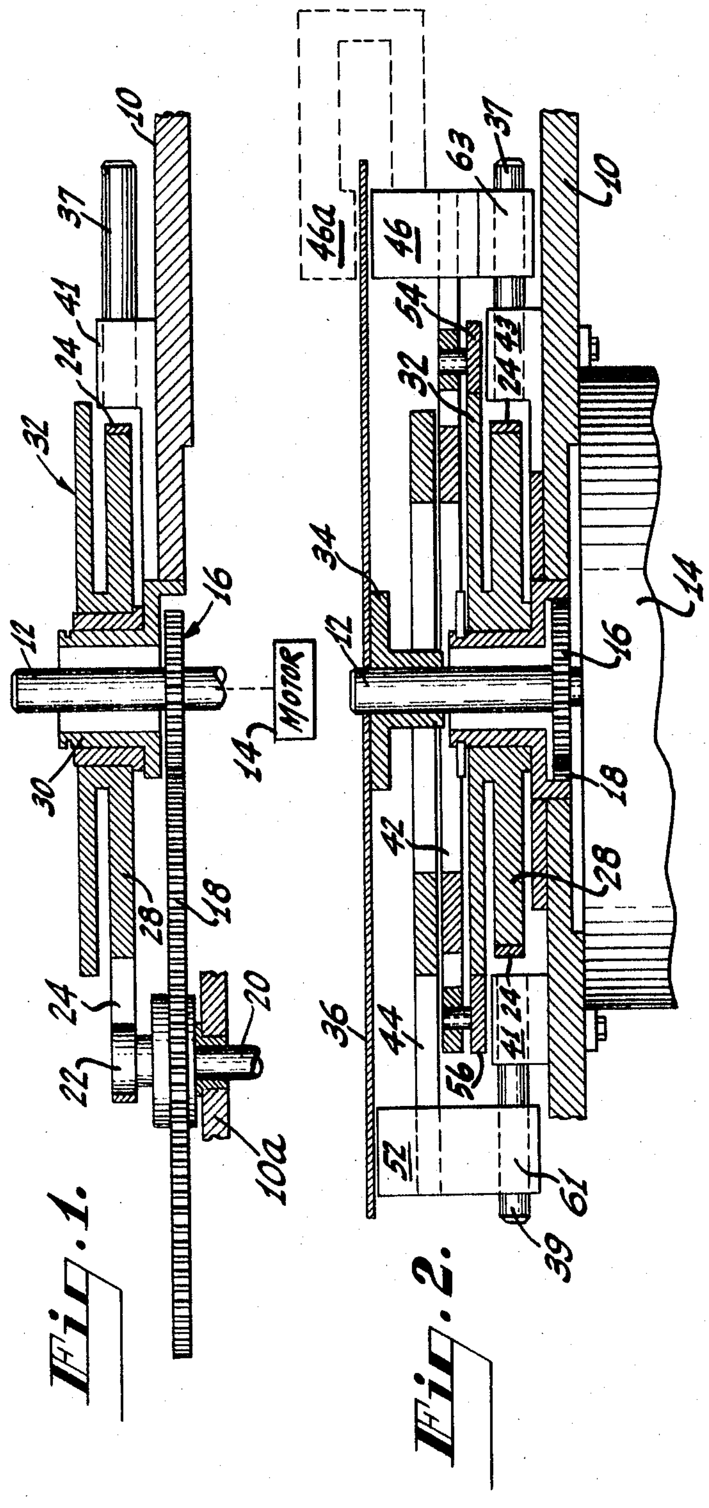
FIG. 1 is a section through a disk storage system embodying the present invention taken along line 1–1 of FIG. 6 showing only some of the parts.
FIG. 2 is a cross section through a disk storage system embodying the invention taken along line 2–2 of FIG. 5, showing additional parts.

As is best shown in FIGS. 1 and 2, the disk storage system embodying the invention includes a base, a portion of which is shown at 10, and a shaft, shown in part at 12, rotatably mounted to the base. The driving means for the shaft may be a motor such as shown schematically at 14 in FIG. 1. A gear 16 which is fixed to the shaft 12 engages a larger gear 18. The latter is supported by a shaft 20 which is also rotatably mounted to the portion 10*a* of the base.

A pulley 22 is fixed to shaft 20 and this pulley is coupled by means of a nonslip belt 24 to the larger pulley 28. Pulley 28 is rotatably mounted on the supporting structure 30 and the cam 32 which is fixed to the pulley 28 rotates about this same structure when the pulley 28 is driven.

Some of the additional structure of the system is shown in FIG. 2. A disk supporting element 34 is fixed to the shaft 12 and supports the disk 36. The latter may be a flexible or a rigid disk.

Figure 6:
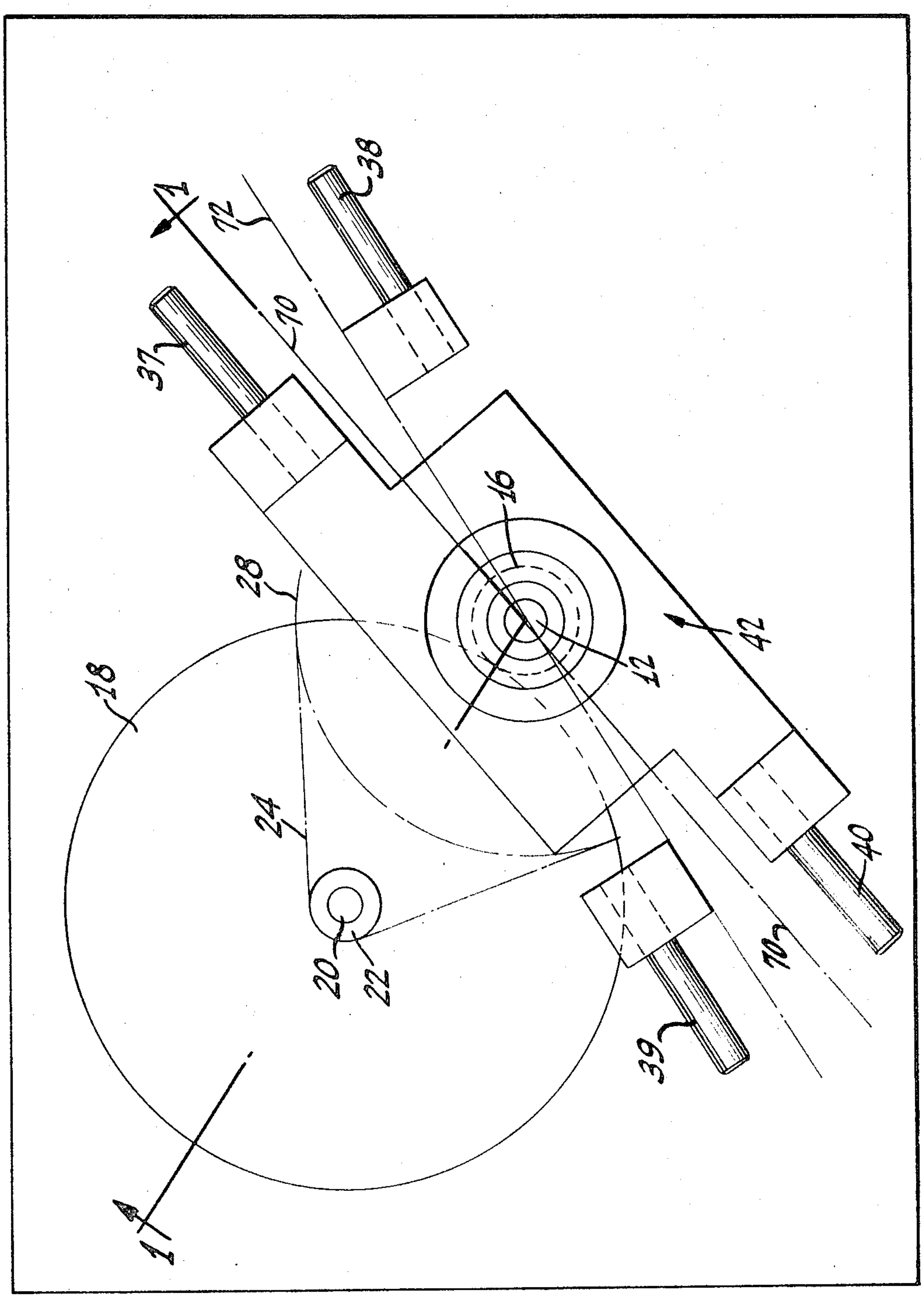
FIG. 6 is another view similar to that of FIG. 5 but with some of the parts not shown.
Figure 7:
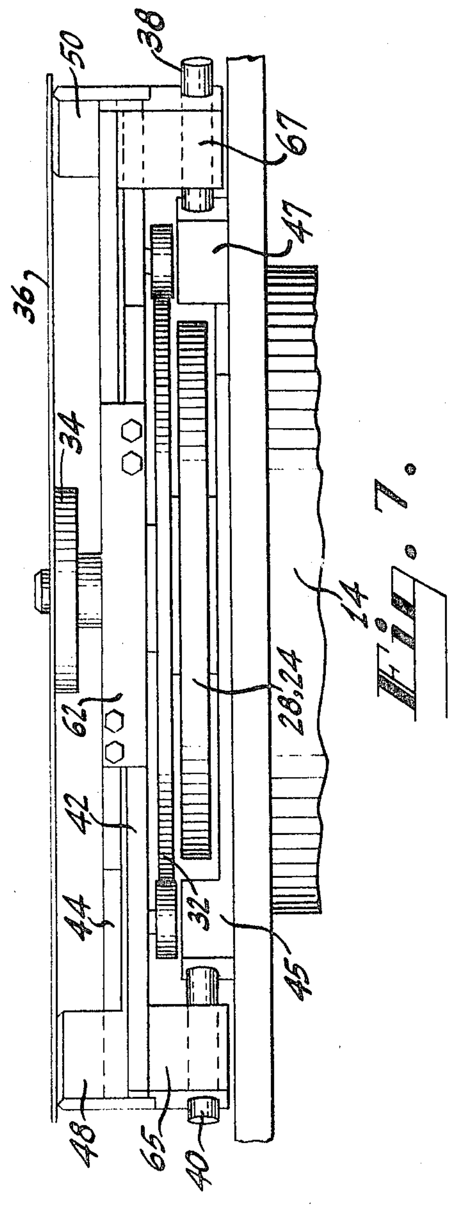
FIG. 7 is a side view of the system embodying the invention.

There are four rods 37, 38, 39 and 40 for slidably supporting the structure on which the read and write heads are mounted. The rods are secured to the base by fixtures 41, 43, 45 and 47, respectively, (see FIGS. 1, 2 and 7). FIG. 2 shows, in part, the head supporting structures or carriers 42 and 44. Carrier 42 has secured thereto bearing blocks 63 (FIG. 2) and 65 (FIG. 7) and carrier 44 has secured thereto bearing blocks 61 (FIG. 2) and 67 (FIG. 7). Carrier 42 is slidably supported by its bearing blocks on rods 37 and 40. A top view of this structure appears in FIGS. 5 and 6. The other head supporting structure, carrier 44, which is shown in plan view in FIG. 5 and partially in FIG. 6, is slidable along rods 39 and 38. Rods 37 and 40 are parallel to and on opposite sides of one radial line 70 (FIG. 5); rods 38 and 39 are parallel to and on opposite sides of another radial line 72.

Figure 3:
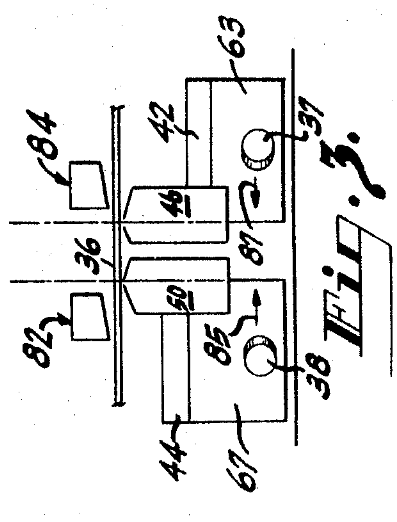
FIG. 3 is an end view of the magnetic head supporting structure in one form of the present invention.

One or more read heads 46 are fixed to the head supporting structure 42, as shown in FIG. 2. In one practical design, there was one read only head and one read before write head; however, in others there may be less than or more than this number of such heads. These heads are also shown in top and end view in FIGS. 5 and 3, respectively. There are also read heads 48 on the diagonally opposite end of the head supporting structure 42. In similar fashion, one or more write heads are located at 50 and 52 at opposite ends of the head supporting structure 44. Again, in one practical design there was only a single head at 50 and a single head at 52; however, this is merely illustrative, as there may be more heads than this.

Figure 5:
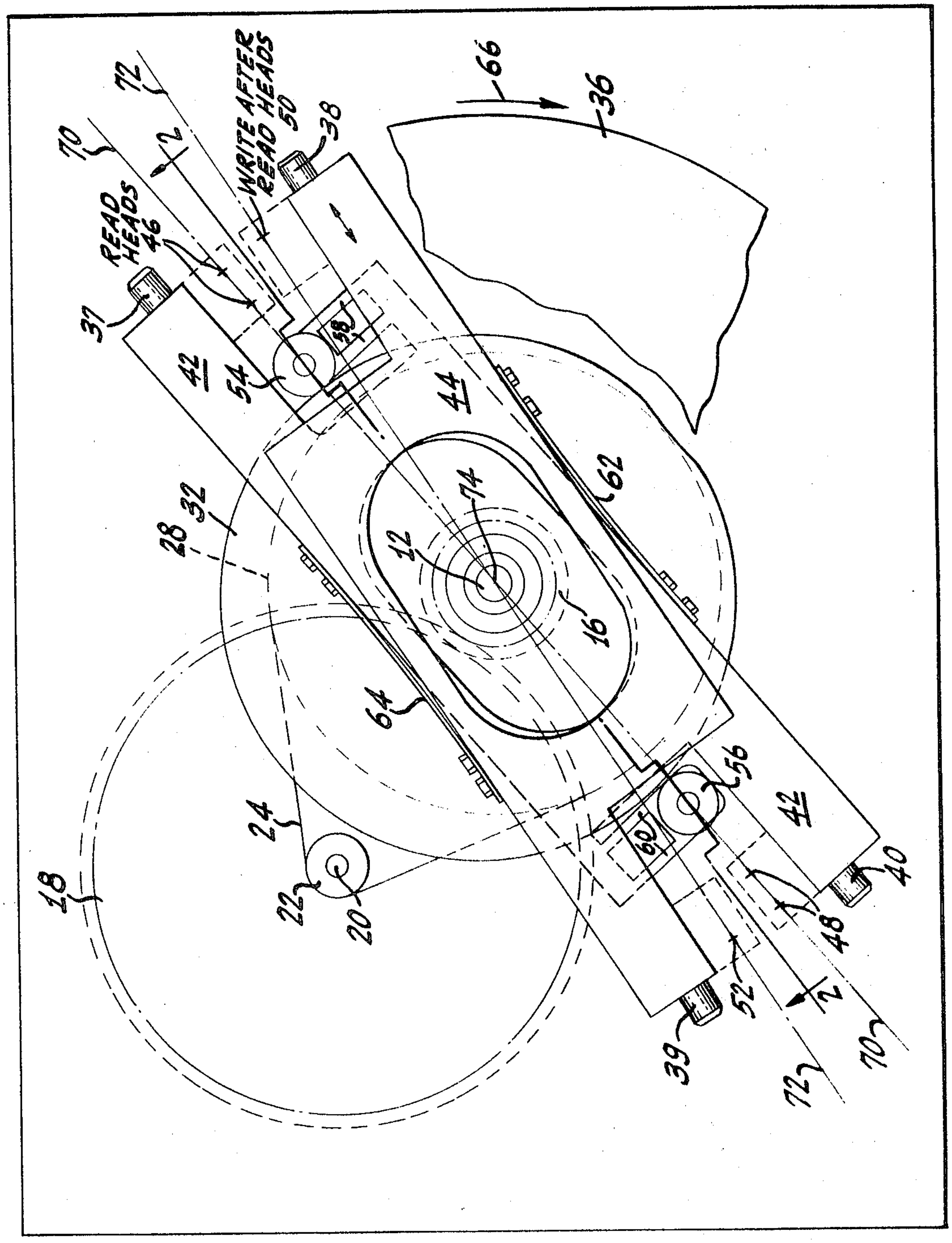
FIG. 5 is a top, partially cutaway view of the disk system of the invention.

FIG. 5 shows the cam 32 in top view. The design of the cam is such that the distance from edge-to-edge of the cam along a line passing through a point corresponding to the center 74 of the shaft supporting the cam is constant regardless of the position of the line. Two cam followers 54 and 56 engage this cam and, in view of the cam design, remain substantially equidistant from one another as the cam rotates. The cam followers are secured to the supporting structure 42 by flexure elements 58 and 60. The head supporting structure 42 is coupled to the head supporting structure 44 by means of two leaf springs 62 and 64, respectively. A side view of spring 62 appears in FIG. 7. There are two reasons for these springs. One is to permit one head supporting structure to move relative to the other (to permit the angle between 42 and 44 to change) as the cam followers track the cam. The other is to preload the slide bearings inwardly (in the directions of arrows 85 and 87 in FIG. 3) against the slide rods such as 37 and 38.

In the operation of the system discussed above, the motor 14 continuously rotates the shaft 12 and the recording disk 36. The direction of rotation may be that indicated by arrow 66 in FIG. 5. The gear 16 engages the gear 18 and rotates the latter but at a much slower speed than the rotation of gear 16. Thus, the shaft 20 rotates at a fraction of the speed of shaft 12. Similarly, in view of the relative diameters of the pulleys 22 and 28, the cam 32 rotates at a fraction of the speed of the rotation of shaft 20. It is also clear that the rotational speed of the cam 32 is only a fraction of that of the disk 36. In one practical embodiment of the invention, for example, the speed ratio is 1 to 16.

As the cam 32 and the disk 36 rotate, the cam followers 54 and 56 are driven by the cam so that their distance from the shaft 12 varies. As the cam follower 54 moves away from the shaft 12, cam follower 56 moves toward the shaft 12 and vice versa. The cam followers are coupled by the flexure elements 58 and 60 to the magnetic head supporting structures 42 and 44. Therefore, as the cam 54, for example, moves away from the shaft 12, that is away from the disk center, the read and write heads 46 and 50 move in the same direction.

The shafts 37 and 38 are parallel to lines 70 and 72 which extend radially from the exact center 74 of the disk 36. The heads 46 and 50 are so mounted to the supporting structures 42 and 44 that their magnetic gaps align with these radial lines 70 and 72, respectively. Thus, as the heads, for example, move away from the disk center they remain aligned with the radial lines 70 and 72 and the spacing between them increases. As the heads move toward the disk center, the spacing between them decreases but they still remain aligned with the radial lines 70 and 72. The leaf springs 62 and 64 permit this type of relative head movement. Further, as a pair of heads move radially and move also toward or away from one another, they continue to follow the same track.

In the system as described above, the read and write head move along spiral tracks which extend around the disk center. The rotating speed of the disk may be maintained constant and the write frequency also may be maintained constant without introducing any errors in the read or write operation. The reason is that as the distance of the heads from the disk center changes which, as explained in the introductory part of this application, implies a change in the bit-packing density,, the spacing between the read and write heads also changes so that the number of bits recorded or read from the length of track between a read head and a write head remains constant.

While the invention has been described in terms of spiral recording, it should be clear that the principle involved is equally applicable to circular recording. In an arrangement of the latter-type, each track is equidistant along its length from the disk center, that is, each track is a circle rather than of spiral shape. With circular scan, the different tracks are accessed by moving the heads in discrete steps from one group of tracks to another in a manner well understood in the art. For example, a screwdrive and step motor may be employed. In this type of recording, just as in spiral scan recording, if the principles of the present invention are employed, the same number of bits are recorded in the length of the track between a read head and a write head regardless of the radial position of that head or heads.

In the system embodying the present invention, there are two sets of read heads and two sets of write heads. The reason is to permit quick retrace. If it is desired, for example, to read from and write on spiral tracks in the direction from the outer to the inner region of the disk, one set of read and write heads is employed to perform these functions. When this set of heads reaches its extreme position, that is, its point of closest approach to the center of the disk, retrace is achieved by switching from that set of heads to the opposite set of heads. At the instant of switching, the opposite set of heads is, of course, at the outer extreme of the spiral tracks and they can immediately start reading from and writing on the tracks. For example, when heads 46 and 50 are at the inner extreme of the spiral tracks, heads 48 and 52 are at the outer extreme of the spiral tracks.

Figure 8:
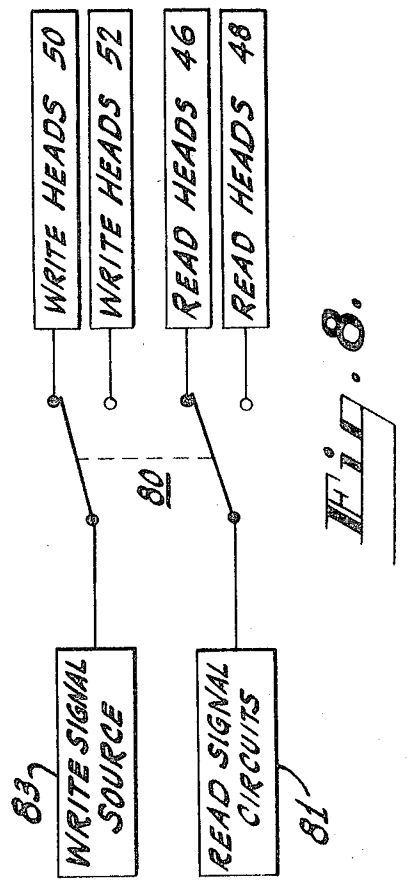
FIG. 8 is a block diagram showing a portion of the electrical circuit of the present system.
Figure 9:
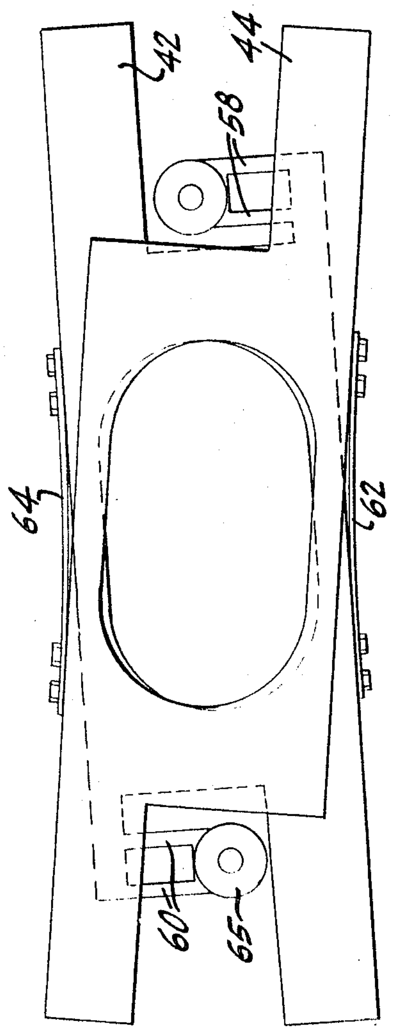
FIG. 9 is a top view of the carriers 42 and 44.
Figure 10:
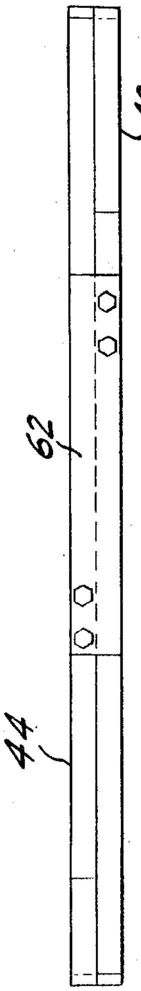
FIG. 10 is a side view of FIG. 9.
Figure 11:
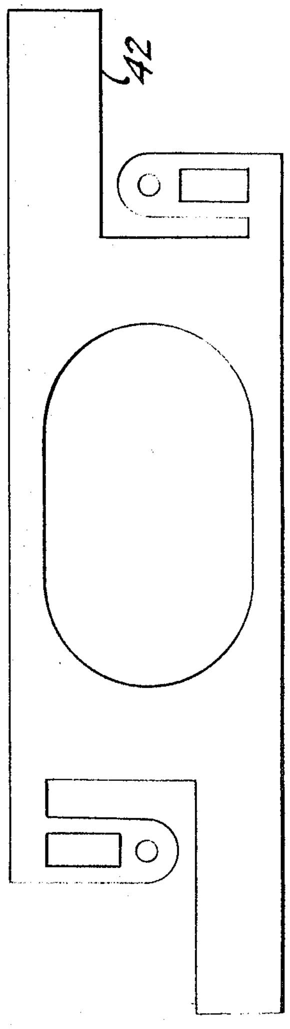
FIG. 11 is a top view of carrier 42.

The above is illustrated schematically in FIG. 8. The switching means is shown as a ganged mechanical switch 80 however, in practice, the switch may be electronic in nature. This means serves to connect the read and write signal circuits 81 and 83, respectively to leads 46 and 50 respectively or leads 48 and 52 respectively.

A number of modifications of the invention are possible. For example, by using a second group of heads corresponding to the heads shown but located above the disk, both sides of the disk may be written on and read from simultaneously. One such group of heads is shown by dashed lines at 46*a* in FIG. 2. There may be corresponding heads (not shown) above the remaining heads.

As already mentioned, the disk 36 may be a flexible disk or a rigid disk. In the former case, the disk may fly on a thin air film over the magnetic heads so as to reduce wear of the heads and disks, or the disk may employ a lubricating substance such as graphite, or the like or be in actual contact with the heads. In either case, stabilizing pads, such as shown at 82 and 84 in FIG. 3, may be employed to maintain the disk position stable as it rotates at relatively high speed.

Figure 4:
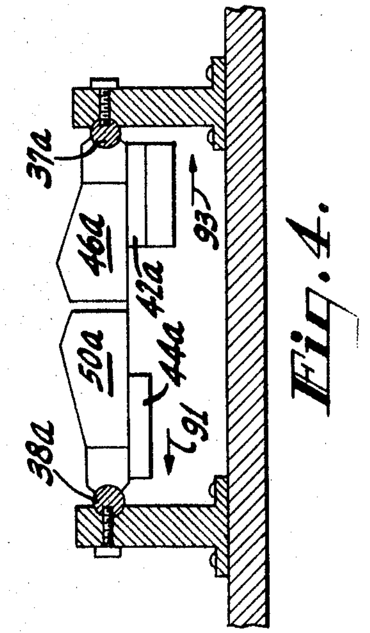
FIG. 4 is an end view of another form of the arrangement of FIG. 3.

It is also to be appreciated that while the invention is illustrated in terms of magnetic recording, it is applicable to other forms of recording as well. Further, even for use in magnetic recording, it is to be appreciated that other types of head structures may be used. One such modified form of head structure, this one more compact than the FIG. 3 arrangement, is shown in FIG. 4. Here, the head carriers 44*a* and 42*a* are preloaded outwardly as indicated by arrows 91 and 93 against the slide rods 38*a* and 37*a* respectively. Such preloading may be achieved with properly shaped, curved springs corresponding to 62 and 64.

In the recording system embodying the invention, in order to insure high accuracy in guiding the heads, the carrier assembly, while being relatively flexible transversely, remains extremely rigid longitudinally and torsionally. The accuracy of movement of the carriers 42 and 44 depends upon the accurate setting of the rods 37, 38, 39 and 40 and, in practice, it is found relatively easy to achieve such an accurate setting. The design of the present system also allows relatively large changes in the angle between carriers 42 and 44 and corresponding changes in the distance between the heads. Such a change must be made when the recording frequency is changed. In one practical design, such change is also achieved by shifting the position of the carrier 42 relatively to the carrier 44. One way such a shift can be made is to loosen the bolts or screws (not shown) securing the carrier 42 to its bearing blocks 63 and 65 and, after the adjustment has been made, again tightening these bolts or screws.

The cam of the recording system of the invention is designed to produce accurate, linear, reciprocating motion. This permits the recording track density to be high, that is, it permits the spacing between adjoining tracks to be relatively small. The cam produces instantaneous reversal of motion at the respective limits of the spiral tracks. At a linear speed of one-half inch per second or less, the reversing acceleration is not very high. However, if the cam followers were rigidly attached to the carrier, a knocking sound would be heard each time the carrier reversed. The flexure elements employed in the present system, in addition to being mechanically simple and relatively inexpensive, eliminate backlash as well as impact on reversal. The use of such elements results in relatively quiet operation as compared to springs and is more reliable and more compact than springs.

What I claim is:

1. In a recording system, in combination:

a rotatable storage disk having a recording surface located between the disk center and its circumference;

first transducer means coupled to the disk at its recording surface and movable along a radial line toward and away from the disk center, between two limits, as the disk rotates;

second transducer means coupled to the disk at its recording surface which moves along a radial line relative to the disk center between the same two limits but in a direction opposite to that of the movement of the first transducer means, as the disk rotates; and means for switching from one transducer means to the other when one is at one limit of its movement and the other is at the other limit of its movement.

2. In a recording system as set forth in claim 1, each transducer means comprising two transducers and further including means for changing the spacing between the two transducers of each transducer means in accordance with their spacing from the disk center.

3. In a recording system as set forth in claim 1, further including drive means coupled to said disk, and in which the means for moving the first and second transducer means comprises a cam which is rotatable around the disk axis, is parallel to the disk and which is driven by said drive means for said disk, and a cam follower coupled to both of said transducer means and in engagement with said cam.

4. In a recording system as set forth in claim 3, said means for moving said first and second transducer means including means for rotating said cam at a fraction of the speed of said disk.

5. A recording system comprising in combination:

a rotatable storage disk;

a pair of heads mounted to follow the same track on the disk as the disk rotates; and drive means common to the pair of heads for moving them in unison along two different radial paths along the same surface of the disk while maintaining both heads spaced substantially the same distance from the disk center, said drive means comprising:

a cam which is parallel to the disk, is fixed to a support rotatable about the disk axis, is of variable dimension in the direction of the disk radii, and which is driven with the disk;

two mechanically coupled structures supporting said heads for movement along said radial paths; and a cam follower secured to one of said structures and engaging said cam.